April 15, 1958 J. H. TARLTON 2,830,531
FRUIT ARRANGING AND MARKING MACHINE
Filed Aug. 23, 1954 4 Sheets-Sheet 2
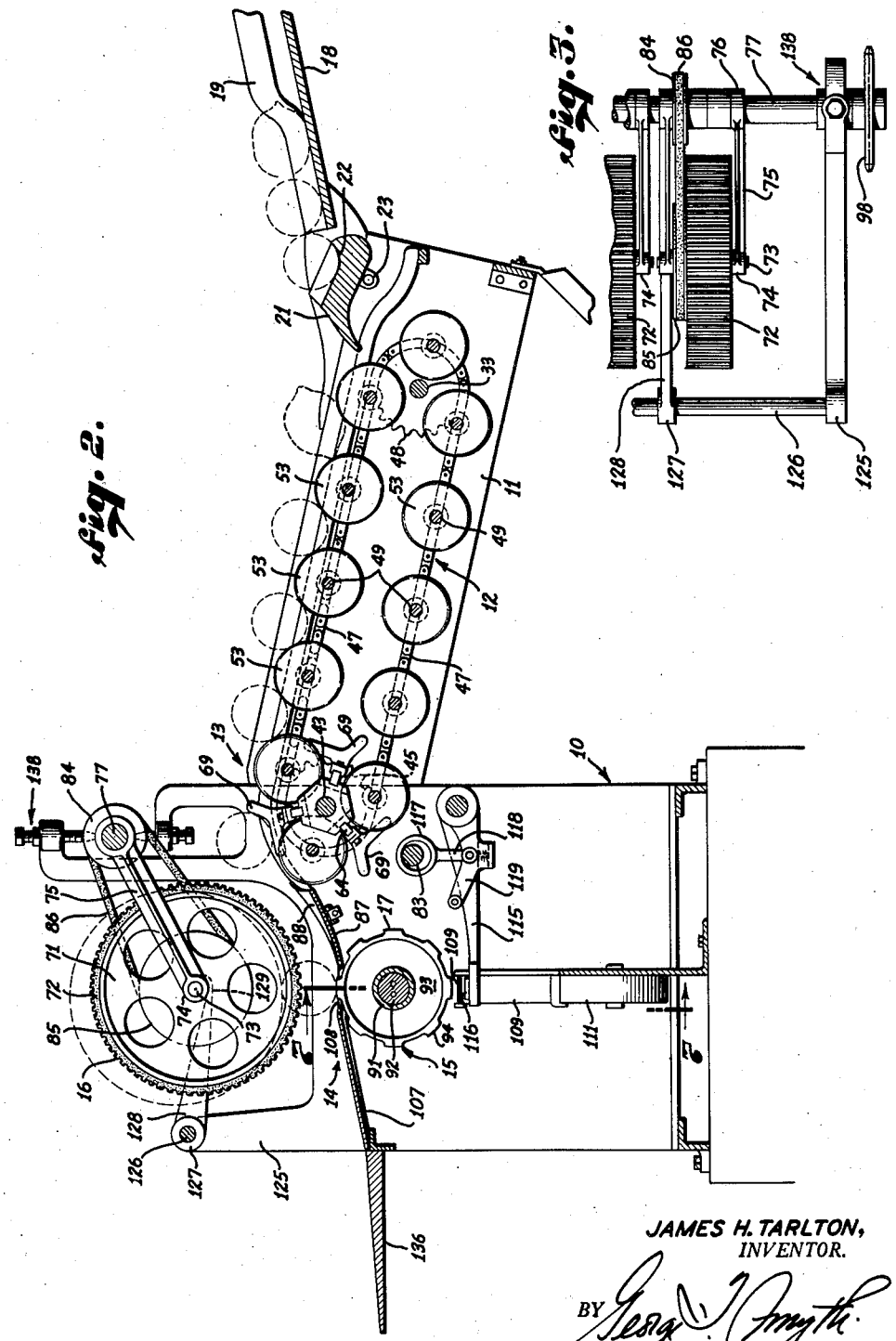
JAMES H. TARLTON,
INVENTOR.
BY *[signature]*
ATTORNEY April 15, 1958  J. H. TARLTON  2,830,531
FRUIT ARRANGING AND MARKING MACHINE
Filed Aug. 23, 1954  4 Sheets-Sheet 3

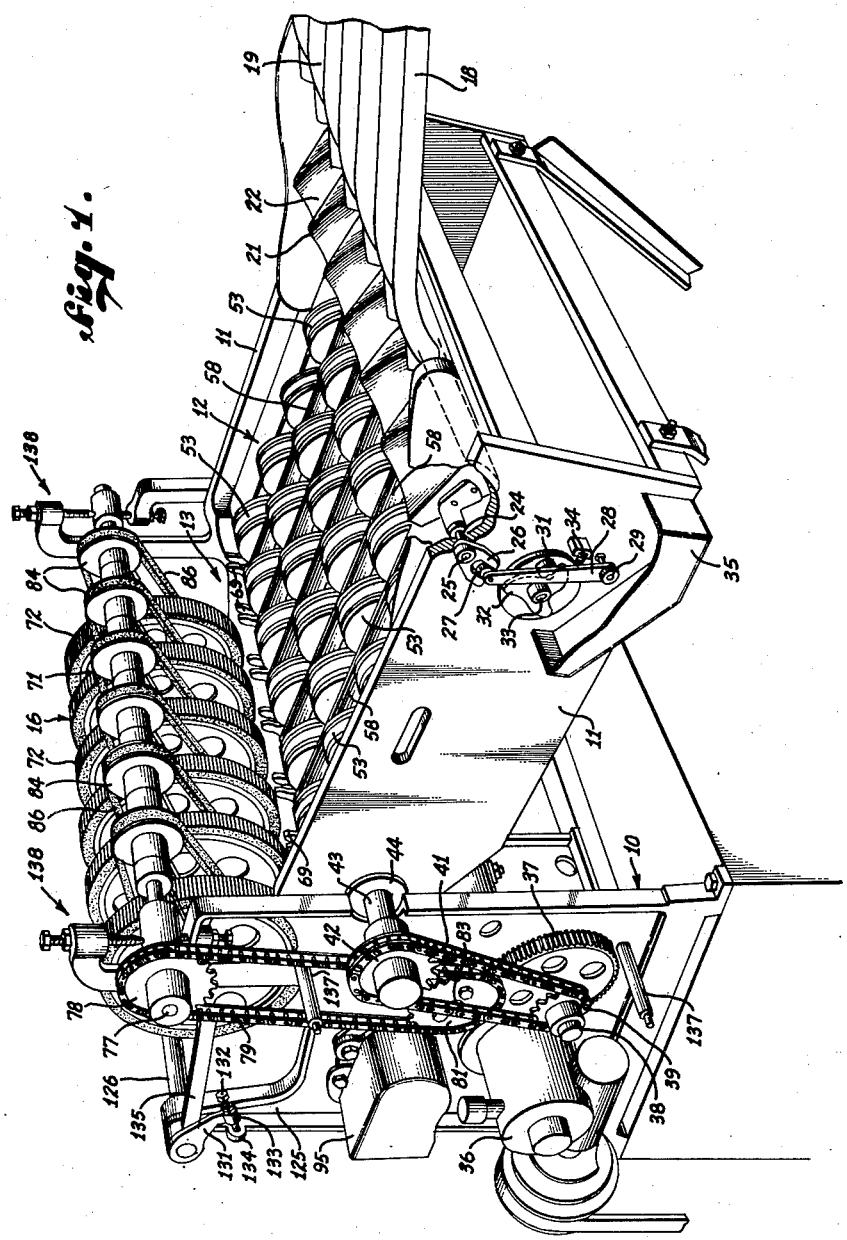

JAMES H. TARLTON,
INVENTOR.

BY
ATTORNEY

April 15, 1958  J. H. TARLTON  2,830,531
FRUIT ARRANGING AND MARKING MACHINE
Filed Aug. 23, 1954  4 Sheets-Sheet 4

JAMES H. TARLTON,
INVENTOR.

BY
ATTORNEY 2,830,531
Patented Apr. 15, 1958

United States Patent Office

2,830,531
FRUIT ARRANGING AND MARKING MACHINE

James H. Tarlton, Inglewood, Calif.

Application August 23, 1954, Serial No. 451,341

3 Claims. (Cl. 101—37)

This invention relates to fruit marking machines and more particularly to such a machine for applying a trademark or similar indicia to each fruit passed through the machine.

The machine of the present invention is particularly adapted for marking or printing trademarks or similar indicia on lemons, although, as will be shown, the machine is not necessarily limited to such use. The citrus industry has long sought a machine for applying a trade mark or the like to lemons to the end that the origin of such a fruit could be identified. Although many machines have been previously proposed, these prior machines have not been adopted by the industry for primarily two reasons; the prior machines either scored the peel or skin of the lemon, or did not uniformly print the indicia on the fruit. Lemons are consequently not marked today with a trademark, but rather the trademark is carried by a wrapper in which the lemon is encased or enclosed.

One of the difficulties heretofore experienced in machines proposed for marking lemons arose becouse lemons are particularly subject to decay if the rind or peel is scored or damaged. The peel or rind of this fruit contains a number of oil cells which, if ruptured or broken, bring about a quick decay of the fruit. A machine which is likely to score or bruise the lemon peel or rind cannot be used if the friut is to be sold in commercial channels.

Furthermore, lemons are not uniform in shape, being basically somewhat ovaloid, and could not be passed through the usual coveying systems of prior marking machines and even those successfully used in marking other citrus friuts, such as oranges. Even where the fruit are graded for size the configuration of the graded fruit will vary to a considerable extent. This shape deviation renders the fruit difficult to properly align in the machine and particularly complicates the presentment of the fruit to the marking station of the machine.

To uniformly apply a trademark or the like to lemons as the same pass through the marking station, the fruit must be first separated and uniformly oriented prior to its entry into the marking station. In other words, the attitude of successive fruits entering the station must be uniform or constant. Furthermore, the fruit must be held in the desired attitude as it passes through the station, for otherwise a non-uniform marking will result.

The machine of the present invention comprises feed or conveyor means which also include means operative to separate and orient the fruit even though the latter are discharged thereinto in random or haphazard attitudes. This means acts to arrange each fruit into an attitude in which the longer axis or dimension of the fruit is arranged substantially horizontal and parallel to the same axis of leading or trailing fruits passing through the machine. The now properly oriented fruit are conveyed by the feed means to a transfer means which acts to remove the oriented fruit from the feed means and presents the same to the printing means of the marking station in the same attitude as it occupied at the exit end of the feed means. Thus, the transfer means holds the fruit against disarrangement as the latter is removed from the feed means and presented to the marking station of the machine.

To insure the continued orientation of the fruit in the desired attitude, the marking station includes means for moving the individual fruit into the printing means of the station while holding the fruit against movement out of the desired spatial or oriented position. Thus, once the fruit is arranged or oriented in the desired uniform spatial arrangement, the means successively handling the fruit, hold the fruit against disarrangement until the same has been marked by passage through the marking station.

The moving means of the marking station, in addition to moving the fruit into operative engagement with the marking or printing means, also coacts with the latter to uniformly mark the fruit. This moving means further is so constituted as to automatically compensate for varying sized fruit to bring about a substantially uniform marking of the fruit even though considerable variance in size is had.

The marking means of the machine comprises a plurality of identical printing die elements which are seriately moved into operative position from a position in which a fresh coating of ink is supplied thereto. The die elements are formed with the fruit contacting surfaces smoothly curved and free of any sharp corners so that all danger of the fruit being scored or cut, as the same are moved thereover, is obviated.

The transfer means actually places the fruit in the uniform oriented attitude just in advance of the die elements in the flow path of the fruit through the machine. The moving means of the marking station immediately rolls the fruit with a light pressure over the die elements without a time lag sufficient to allow the fruit to become displaced from the attitude necessary to insure uniform marking of the fruit. From the marking station, the fruit may be passed into suitable containers or onto belt conveyors for subsequent packing for shipment.

As the feed means will separate and arrange the fruit to place the longer axis thereof substantially horizontal prior to the removal of the fruit therefrom by the transfer means and as the latter presents the fruit to the marking dies in exactly the same attitude occupied by the fruit at the exit end of the feed means, the fruit are uniformly marked and in substantially the same median position intermediate the ends thereof.

Other features and advantages of the present invention will be hereinafter apparent from the following description, particularly when taken in connection with the accompanying drawing, in which:

Figure 1 is a perspective view of the machine of the present invention;

Figure 2 is an elevational view with a portion of the frame removed and with some components of the machine shown in section;

Figure 3 is a plan view of a portion of the fruit-moving means of the marking station;

Figure 4:
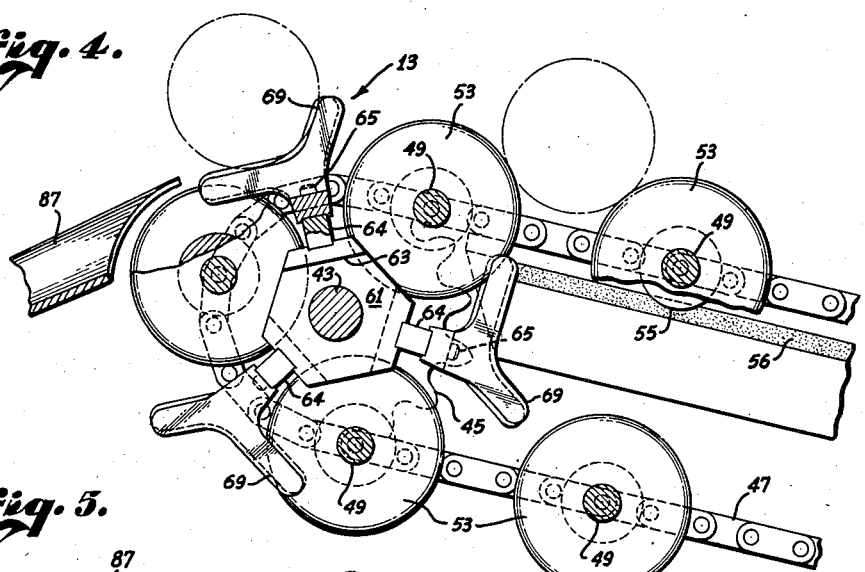
Figure 4 is a fragmentary elevational view on an enlarged scale showing the exit end of the feed means and the transfer means for removing the oriented fruit from the former.

The machine of the present invention, referring now to the accompanying drawing and more particularly to Figure 1 thereof, comprises a frame, generally indicated by the reference character 10, and including a pair of spaced plates 11 which form a housing for a feed means 12 for conveying fruit to a transfer means 13 which moves the fruit from the feed means for presentment to a marking station, indicated generally by the reference character 14. The marking station is composed of or includes a marking die assembly 15 and roller means 16 for moving the fruit over the individual die elements 17 of the assembly 15.

The feed means 12 includes an inclined chute 18 having tracks 19 over which fruit are moved by gravity from a hopper or like supply, not shown, to a separator 21. The separator 21 comprises an elongate preferably cast member having formed therein a plurality of spaced-apart depressions or pockets 22. A rocker shaft 23, as will be shown, mounts the separator 21 between the plates 11 for rocking movement about the axis of the shaft 23. The shaft 23 so positions the separator 21 that the pockets 22 thereof are aligned with the tracks 19 of the chute 18. It will therefore be seen that fruit moving downwardly over the tracks 19 will be discharged from the chute 18 into the pockets or depressions 22 of the separator.

Mounted to at least one end face of the separator 21 is a journal bracket 24 rotatably supporting a stub shaft 25 passed through an opening formed in the contiguous side plate 11 and having longitudinal axis parallel to, but displaced from, the axis of the shaft 23. Fixed to the outer projecting end of the shaft 25 is a bifurcated member 26, between the bifurcations or legs of which is mounted a hardened roller element 27. This element is rotatably carried by the one end of an arm 28, the opposite end of which is pivotally mounted to the plate 11, as indicated at 29, and spaced downwardly from the stub shaft 25. Carried by the inner face of the arm 28, intermediate the ends thereof, is a second roller element 31 adapted to engage a three-lobed cam 32 fixed to the projecting end of a shaft 33 which is rotatably supported between the plates 11. This shaft is rotatably driven by means hereinafter described and suffice it to say now, rotation of the cam 32 brings about periodic pivotal movement of the arm 28 through engagement of the spaced lobes of the cam with the roller element 31. The arm 28 is normally urged in a counter-clockwise direction as viewed in Figure 1, to maintain engagement of the roller element 31 with the cam 32 by a spring 34 compressed between the arm 28 and a suitable bracket fixed to the plate 11. This pivotal movement of the arm 28 results, as will now be seen, in periodic rocking movement of the separator because of the driving engagement of the roller 27 with the bifurcations of the member 26 which is fixed to the projecting end of the shaft 25. A small casing 35, fixed to the plate 11, houses the mechanism just described and protects the same against damage.

The separator 21, as best seen in Figure 2, is formed with a rearwardly disclosed edge which moves upwardly, as the separator is rocked in a counter-clockwise direction, to block movement of the lowermost lemons in the tracks 19 of the inclined chute 18 into the pockets 22 of the separator. As the separator is rocked in the opposite direction, this rearward edge drops downwardly below the tracks 19 to permit lemons to move into the pockets of the separator. Lemons occupying the pockets 22 of the separator are ejected therefrom as the separator again is rocked in a counter-clockwise direction to be gently deposited onto the drive means of the machine of the present invention.

The drive means of the present invention is actually an escalator for moving lemons from the separator upwardly to the transfer means, which, as previously explained, moves the lemons from the exit end of the escalator or drive means to the marking station of the machine.

Figure 5:
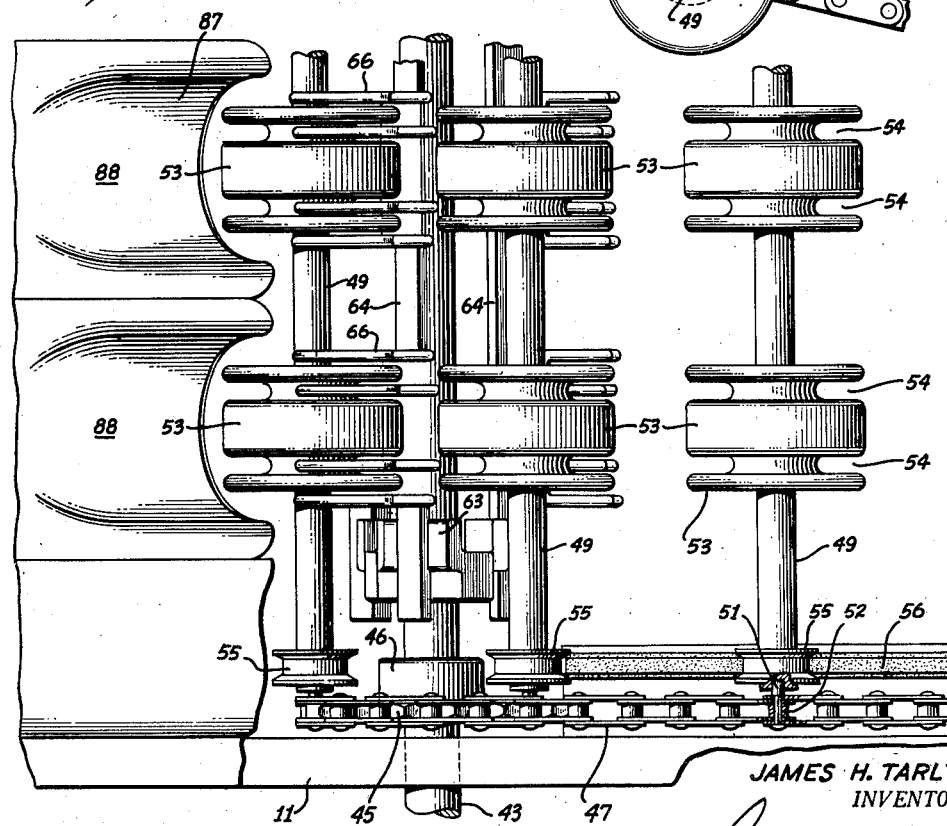
Figure 5 is a fragmentary plan view on an enlarged scale showing the means for discharging the fruit onto the feed means.

The escalator or feed means of the machine of the present invention is preferably driven by an electric motor, not shown, but mounted by suitable bracket supports to the frame 10. The motor, through a suitable mechanism including a reduction means 36, drives a large gear 37 fixed to one end of a shaft 38 journalled on the frame 10 and extending transversely thereof. A smaller gear 39, also fixed to the shaft 38, engages and drives a conventional endless drive chain 41 which is drivingly passed about a gear 42 fixed to a shaft 43. This shaft is rotatably supported by suitable bearing members 44 carried by the plates 11 and the shaft extends, as best seen in Figure 5, transversely of the housing formed by the plates 11. Fixed to the shaft 43 adjacent each end thereof, but within the housing formed by the plates 11 is a sprocket wheel 45. Each sprocket wheel includes a hub 46 sleeving the shafts 43 and held thereto for rotation therewith.

An endless sprocket chain 47 is passed about each sprocket wheel 45 and each chain extends about and drives one of a second pair of sprocket wheels 48 fixed to the shaft 33 adjacent the opposite end portions journalled in the plates 11. The sprocket chains 47 carry spanwise extending shafts or rods 49 the opposite end faces of which are formed, as best seen in Figure 5, with longitudinally extending blind bores rotatably receiving the inwardly projecting enlarged ends 51 of selected pivot pins 52 interconnecting pairs of links of the chain 47. It will thus be seen that the rods 49 will be moved with the chains as the latter are driven with the shaft 43.

Each rod 49 carries, at preselected spaced positions therealong, a plurality of roller members 53, cylindrical in shape, and each formed with a pair of spaced circumferentially extending grooves 54. The roller members 53 are fixed to each rod by means of a set screw, not shown, and will when properly mounted, rotate with the rod to which they are mounted.

The rods are rotatably driven, in the illustrated embodiment of the present invention, through pulleys 55 fixed to each of the rods 49 adjacent the opposite ends thereof and engaged with fixed V-belts 56 longitudinally supported of the housing by flanges or the like 57 fixed to the inner surfaces of the plates 11. The V-belts are so positioned as to be engaged by the pulleys 55 as the chains 47 move through their upper courses defined by the sprocket wheels 45 and 48. It will thus be seen that as the chains 47 move through their upper courses, the pulleys 55 moving with the chains are also rotatably driven and consequently also the roller members 53 through engagement of the pulleys with the fixed V-belts 56 aligned with the path of travel of the pulleys.

The roller members 53 fixed to the rods 49 are so spaced as to provide linearly arranged series of rollers, as best shown in Figure 1, which are aligned with the pockets 22 of the separator. Thus, fruit ejected from the separator 21 as the latter is intermittently rocked through actuation of the cam 32 and its associated drive elements, moves into the space between a pair of longitudinally aligned roller members 53. As the cam 32 is carried by the shaft 33, which also mounts the sprocket wheels 48, the intermittent rocking of the separator 21 can be correlated to movement of the rollers 53 to insure that a pair of rollers are disposed beneath the separator at the time the latter is rocked to move a lemon off the same and onto the escalator formed by the rollers and the drive means therefor. Thus as the separator is rocked in a counter-clockwise direction, a lemon held in a pocket thereof will be moved onto the escalator as the rearward edge of the separator moves upwardly to block movement of the lowermost lemon in the aligned track of the chute 18.

Although lemons are haphazardly deposited in a random arrangement onto the escalator by the separator, the lemons, as they are carried upwardly between the roller members 53, are arranged into a position or attitude in which the longer dimension of the lemon is arranged parallel with the rotational axis of the roller members 53. This orientation is brought about by the rotation supported between the rotating roller members 53 as the latter move the lemons toward the transfer means of the machine. To hold the fruit moving upwardly of the escalator against transverse movement, it is now preferred to mount a plurality of spaced-apart rail elements 58 longitudinally of the escalator. These rail elements, in the illustrated embodiment of the present invention, comprise inverted somewhat channel shaped members having their opposite ends fixed to the frame of the machine adjacent the opposite ends of the escalator. The roller members 53 carried by each rod 49 are spaced apart a distance sufficient to accommodate the rail elements 58 which form lanes through which the fruit is moved by the rotating roller members 53. A guard rail 59 is fixed to each of the side plates 11 and extends inwardly over the pulleys 55 to prevent fruit from moving off the outermost lanes defined by the rail elements 58.

As previously explained, the lemons moving up the escalator or feed means will be oriented or uniformly arranged in an attitude in which the longer dimension of the fruit will be disposed transversely of the direction of their travel by the time the lemons reach a point adjacent the sprocket wheels 45. In the machine of the present invention, the now uniformly oriented lemons are lifted from the escalator by the transfer means and presented by the latter to the marking station in the same uniform attitude or orientation.

The transfer means is carried by the shaft 43 and includes a pair of hub elements 61 fixed to the opposite end portions of this shaft, through set screws 62, at positions spaced slightly inwardly of the sprocket wheels 45. The hub elements 61 are formed with circumferentially spaced pads 63, here shown as three in number, projecting laterally in one side of the hub member, to which are mounted elongate bars 64 to extend parallel to the axis of the shaft 43. It will thus be seen that the hub elements 61 with their pads 63 form a spider-type mounting element for the bars 64. The bars are held to the pads 63, which should be first correctly aligned by adjustment of the hub element 61, by screw thread fasteners 65 passed through openings in the bars and threadedly mounted in tapped openings in the pads.

Figure 6:
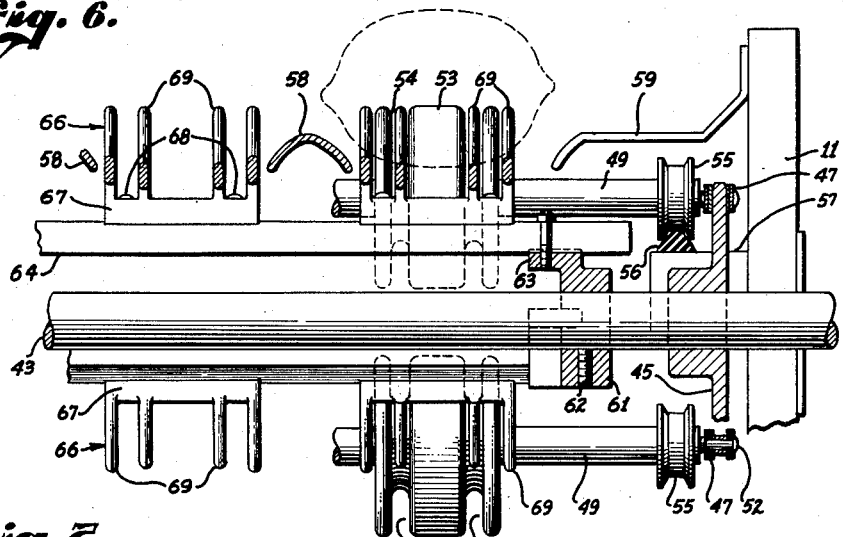
Figure 6 is a fragmentary view in vertical section and on an enlarged scale of the feed means of the machine.

Fixed along each bar 64 is a plurality of finger assemblies 66 equal in number to the roller members 53 carried by each rod 49. Each assembly 66 includes a base member 67 mounted by the fasteners 68 shown to the bar 64 and four fingers 69 projecting outwardly from the base. As the assemblies 66 are rotatably driven by the shaft 43, the fingers 69 of the same move in an orbital path concentric with the shaft 43 which intersects the path of travel of the roller members 53 as they move around the shaft 43 with the chains 47. The fingers 69, of each assembly, are so spaced, referred now to Figure 6, that the innermost pair when the base 67 is properly aligned with one of the roller members 53, will register with and move through the grooves 54 of that member while the outermost pair move in paths closely adjacent the opposite end faces of the roller member 53. Thus the fingers move through the path of movement of the roller members 53 as the latter move around the sprocket wheels 45.

The fingers 69, as best seen in Figure 4, are somewhat L-shaped, as viewed in elevation, to provide a support surface having a smoothly contoured shape corresponding roughly to the medial portion of a lemon. It should now be seen that the fingers 69 of the transfer means 13 will, in moving through the path of travel of the roller members 53, actually lift lemons supported in the desired orientation between adjacent roller members, and arcuately move the lemons without a change in attitude to the marking station. It will be undesrtood that the fingers 69 and their mounting structure must be so carried by the shaft 43 as to be synchronized or properly timed with respect to movement of the roller members 53 as to insure movement of the fingers at the properly-timed interval as the roller members 53 move around the sprocket wheels 45. This can be easily brought about merely by adjustment of the hub element 61 circumferentially of the shaft 43.

The marking station of the embodiment of the invention illustrated is arranged transversely of the machine at the exit or discharge end of the escalator 12. This marking station comprises the plurality of roller means 16 formed by the relatively large wheel members 71, each fitted with a circumferentially extending resilient band 72 formed with a suitable tread as best shown in Figures 1 and 2. Each wheel member 71, referring now to Figure 3, is fixed to a short shaft 73, the opposite ends of which are rotatably supported in bearings 74 each carried by one end of a rigid link 75. The opposite ends of the links 75 are each fitted with a bearing member 76 sleeving a shaft 77. Thus a pair of links 75 support a wheel member 71 for arcuate movement about the axis of the shaft 77, as well as rotational movement with the supporting shaft 73.

The shaft 77 extends transversely of the machine at a position above the escalator 12 and is journalled in suitable bearings carried at opposite sides of the frame 10. The one end of the shaft 77, returning again to Figure 1 of the drawing, carries a gear 78 driven by a sprocket or other conventional drive chain 79 which is passed about a gear 81 fixed to the projecting end of a shaft 83 suitably journalled for rotation about an axis transversely of the machine and parallel to the axis of the shaft 77. The shaft 83 carries a gear, not shown in Figure 1, but engaged and driven by the gear 37 fixed to the shaft 38. It will thus be seen that the shaft 77 is driven from the same power source as the shaft 43 which powers the sprocket wheels 45.

Fixed to the shaft 77 are plurality of pulleys 84 so carried by the shaft 77 as to be aligned with large pulleys 85 each mounted to a shaft 73. A V-belt 86, or the like, is passed about aligned pairs of the pulleys 84 and 85, to the end that the shafts 73 are rotatably driven with the shaft 77. This results, as should now be understood, in rotation of the large wheels 71 with a peripheral speed somewhat equal to the lineal speed of the lemons presented to the marking station by the transfer means 13.

Lemons moved from the escalator by the transfer means are deposited onto a plate-like element 87 formed with a plurality of troughs or groove-like tracks 88 longitudinally aligned with the path of movement of the lemons upwardly of the escalator as defined in part by the rail elements 58 defining the lanes of the escalator. A lemon carried by the fingers 69 from its support position between two roller members 53 is deposited in a trough 88 to be engaged substantially immediately by the resilient periphery of a wheel member 71 and is moved by this element downwardly of the trough 88 to a die 17 of the die assembly 15. As the wheel members are driven in the direction of the lemons downwardly in the trough 88, the lemons are smoothly rolled over the die element 17 with a light pressure.

Figure 7:
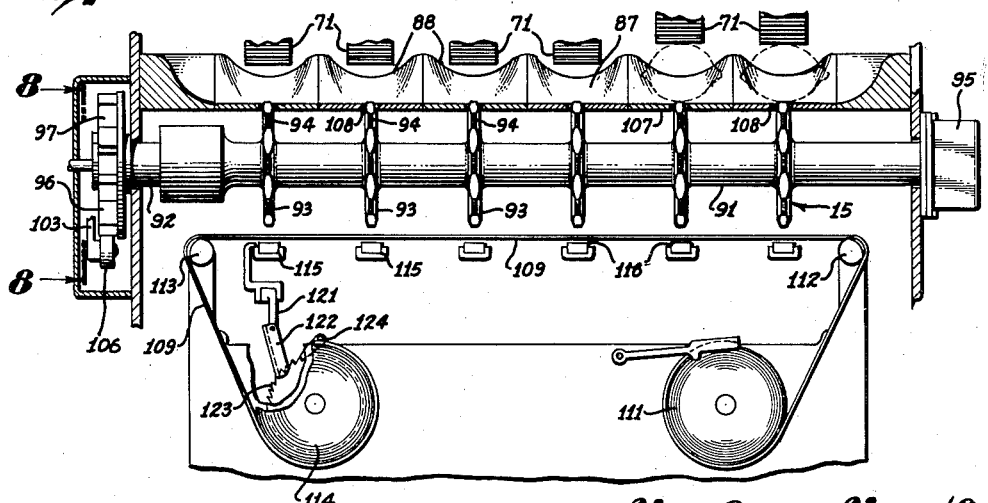
Figure 7 is a sectional view taken along lines 7—7 of Figure 2.

The die assembly comprises, as best shown in Figure 7, a hollow cast member 91 sleeving a shaft 92 rotatably mounted transversely of the frame and having the opposite ends thereof projecting outwardly from the opposite sides thereof. The assembly is formed with a plurality of integral spaced circular webs or flanges 93 and the die elements per se are formed, as best shown in Figure 2, as arcuate shoe-like elements 94 which are clampingly mounted about the periphery of each flange or web 93. Each shoe 94 carries, as best shown in Figure 2, at least four raised lands on which the indicia to be printed is formed.

The member 91 is cast with an electric heater element embedded therein and operative when energized to elevate the temperature of the die assembly and including the lands on which the indicia to be printed are formed. The particular means for conducting current into the heater embedded within the member 91 forms no part of the present invention but comprises suitable collector rings carried by the one end of the shaft 92 together with contact members mounted within a suitable housing 95 which also forms a junction box for conductors to be connected to a suitable source of electric current.

Figure 8:
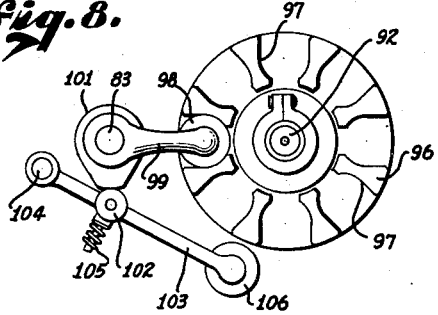
Figure 8 is a sectional view taken along line 8—8 of Figure 7.

Carried by the end of the shaft 92 opposite to the end to which the collector rings are mounted is a drive member 96. This drive member 96, as shown in Figure 8, comprises a circular plate having a plurality of pocket elements 97 formed in the one face thereof and opening onto the peripheral edge face of the member. The pockets 97 are adapted to receive a roller member 98 fixed to one end of a link 99, the opposite end of which is fixedly mounted to the shaft 83. Also carried by the shaft 83 is an eccentric cam 101, the working face of which is adapted to engage against a follower 102 carried by a rigid link 103, the one end of which is fixed to a shaft 104. The shaft 104 is rotatably mounted to the frame 10 of the machine to extend transversely thereof with its axis parallel to the axis of the shaft 83. The link 103 is normally urged in a counterclockwise direction, as viewed in Figure 8, by a spring 105 to hold the follower 102 in engagement with the working face of the cam 101. Carried by the free end of the link 103 is a second roller element 106 which is identical in size and shape to the roller element 98.

As the shaft 83 is rotatably driven, the link 99 as its roller 98 moves into a pocket 97, applies a rotative drive force to the member 96 to produce, as will now be understood, rotation of the shaft 92 to which the die assembly is mounted. It will be seen that the member 96, with its associated drive mechanisms, actually forms somewhat of a Geneva mechanism for producing a step-by-step rotation of the shaft 92. This is so, for as the shaft 83 is rotated to periodically result in the driving force transmitted to the member 96 through the roller 98, the cam 101, with the spring 105, periodically moves the link 103 to intermittently move the roller 106 into and out of engagement with the walls of the spaced pockets 97 formed in the member 96. The cam 101 is so mounted to the shaft 83 with respect to the link 99 thereon that the roller 106 will be engaged in a pocket 97 to hold the shaft 92 against rotation during the time the roller 98 of the link 99 is out of engagement with the member 96. It will thus be seen that the drive mechanism just described will intermittently drive the member 96 fixed to the shaft 92 and consequently the die assembly 15 fixedly sleeving the shaft 92. Mounted to the frame of the machine just over the die assembly is a plate 107 having a series of apertures 108 arranged transversely of the machine and in alignment with the lands of the flanges or webs 93. The lands are of such a size that as they are intermittently moved into registry with the openings 108 they will project upwardly through these openings so that the raised surfaces thereof, forming the printing dies, will be in position to be engaged by a fruit moved thereover by a large wheel element 71.

To apply a coating of ink to the dies, a ribbon 109 carrying a suitable ink is mounted within the frame of the machine, as best shown in Figure 7 of the drawing. This ribbon is carried by a suitable storage reel 111 and is passed therefrom over a pulley or guide sheath 112 and is then extended transversely of the machine in a path substantially parallel to the axis of the shaft 92 to a second guide sheath 113 over which it passes to a take-up reel 114.

Arranged beneath the ribbon 109 and in alignment with the flanges or webs 93 are a plurality of arms 115 each carrying pressure pads 116 which are to be periodically moved upward to move the ribbon 109 against the die element then occupying the lowermost position on each of the webs 93. The mechanisms for arcuately moving the arms 115 are made operative, referring now to Figure 2, by an eccentric 117 mounted to the shaft 83 and adapted to periodically raise and lower the arms 115 through a thrust link 118 fixed to a support assembly 119 to which the arms 115 are connected. The eccentric 117 is so mounted to the shaft 83 in relation to the cam 101 that the pressure pads 116 of the arms 115 move upward to urge the ribbon 109 against the lowermost die elements at the time the escapement member 96 is at rest.

The ribbon 109 is progressively withdrawn from the storage reel 111 by the take-up reel 114 through step-by-step drive of reel 114 as the pads 116 of the arms 115 are moved to urge the ribbon 109 against the printing dies. In the now preferred form of the present invention, the one arm 115 pivotally mounts a link 121 carrying a drive pawl 122 resiliently engaged with teeth 123 circumferentially formed about the reel 114. Thus at each downward actuation of the arms 115, the pawl 122, through engagement with the teeth 123, will rotatably drive the reel 114 a partial revolution to withdraw a preselected length of the ribbon 109 from the reel 111. A holding pawl or dog 124 also resiliently engaged with the teeth 123 prevents return or reverse movement of the reel 114 as the pawl 122 is moved in its return path by movement of the arms 115 upwardly to bring the ribbon 109 into engagement with the printing dies.

It will thus be seen that each time the die assembly comes to a rest the lowermost die element of each web 93 will be coated with a fresh supply of ink so that as the die elements move successively through the apertures 108 they will carry a supply of ink to be applied to the fruit rolled thereover by the wheel members 71.

As the entire die assembly 15 is maintained at a constant elevated temperature by the heating element embedded within the member 91, the ink will be maintained somewhat fluid and thus the fruit, partly because of the state of the ink and partly because the individual die elements are at an elevated temperature, will be very clearly marked as they are rolled over the die elements by the wheels 71.

Figures 9, 10:
Figure 9 is a fragmentary view in elevation of a die element.
Figure 10 is a section taken along line 10—10 of Figure 9.

Each die element is formed, as shown in Figures 9 and 10, with the fruit contacting surfaces smoothly curved and free of any sharp edges. The individual fruit is rolled over a die element by the wheel member 71 engaging the fruit with a light pressure to insure a clear uniform marking and without danger of the die scoring or cutting the skin of the fruit during the actual marking or printing step. As previously explained, each wheel member 71 is mounted by a pair of the supporting links 75 for arcuate movement about the axis of the shaft 77 so that the wheel member is free to move upwardly, as viewed in Figure 2, to accommodate lemons of different sizes as they are engaged by the tread of the resilient band 72 fitted about the wheel member.

To hold the wheels 71 elevated in some preselected positions above the tracked member 87, the frame is formed at opposite sides thereof with upstanding support arms 125 rotatably supporting a shaft 126. Sleeving the shaft 126 at spaced points therealong are bearing members 127, each formed as an integral part of an arm 128 terminating in a finger 129 adapted to engage under a bearing 74 carried by one of the links 75.

Each bearing member 127 carries a set screw to the end that the member can be fixed in some position of adjustment relative to the shaft 126. The shaft itself carries at one or both ends thereof a radially extending arm 131, the free end of which mounts an adjusting screw 132 threadedly mounted in a tapped opening formed in a boss 133 formed integrally with the arm. The support arm 125 carries a pad 134 which is engaged by the one end of the screw 132 as the shaft 126 rotates in a clockwise direction to hold the shaft in a preselected position of angular rotation dependent upon the position of the screw 132 in the boss 133. It will thus be seen that although the engagement of the screw 132 with the pad 134 will limit clockwise rotation of the shaft 126, the shaft is free to rotate substantially a complete revolution in a counter-clockwise direction.

It should now be seen that by adjustment of the screw 132 the rotation of the shaft 126 can be limited in the clockwise direction to prevent corresponding movement of the arms 128 once the bearing members 127 are fixed against rotation relative to the shaft 126. By suitable adjustment of each bearing 127 to the shaft 126 and proper adjustment of the screw 132, the arms 128 will actually support and hold the wheel elements 71 against counter-clockwise movement, as viewed in Figure 2, to maintain a minimum distance between the wheel member 71 and the tracked element 87. The wheel members 71, however, are free to arcuately move upwardly or in a clockwise direction as larger sized fruit move under the wheel members in the operation of the machine.

To permit movement of the wheel members 71 to an inoperative position above the tracked member 87, a handle element 135, as best seen in Figure 1, is fixed to the shaft 126 which can be used to move the shaft 126 in the counterclockwise direction to produce lifting or counterclockwise movement of the arms 128, which, as should now be understood, will result in movement of the wheel members 71 upwardly and in a clockwise direction as viewed in Figure 2.

In the use of the machine, as the fruit are moved the relatively short distance downwardly in the troughs or tracks of the member 87 and over the die element projecting upwardly through the opening 108, the fruit will be carried by the wheel members 71, engaging the same, downwardly of the plate 107 to be discharged from the machine over an inclined trackway 136 into suitable containers or a conveyor arranged adjacent the trackway 136.

It will now be seen that all means of the machine are driven through the several power transmitting means disclosed from a single power source such as an electric motor. It is, therefore, possible, although it has not always been specifically shown, by suitable design and assembly to produce actuation of all moving elements in a preselected sequence of operation to insure the proper coaction of the various means handling the fruit as the same moves through the machine. In other words, the drive means for each operating element is correlated each to the other so that the operation of each element is synchronized with the operation of coacting elements.

For example, the fingers 69 of the transfer means move at such a speed relative to the drive of the escalator that the fingers move intermediate a pair of adjacent roller members to lift an oriented fruit therefrom as said pair of members commence their conjoint movement about the circular path defined by the sprocket wheels 45. The movement of the fingers 69 are further synchronized with the rotational drive of the die assemblies to the end that a wheel member 71 will move a lemon, deposited by the fingers 69 onto the tracked member 87, over an individual die element of the assembly as the die element comes to rest in an opening 108 under the control of the Geneva drive mechanism described.

It is not believed necessary to explain in detail the manner in which other mechanisms of the machine are synchronized as the same should now be obvious from the hereinabove description of the machine and its component parts. It can be pointed out that by proper selection of the gears of the drive assemblies, all shafts can be driven at preselected rotational speeds to insure proper operation of means driven by such shafts.

The components of the main drive means are intended to be protected against damage by a casing not shown, but held to elongate studs 137 projecting, as best seen in Figure 1, from the sides of the frame 10 on which the drive assemblies are carried. Although the shafts 38 and 43 are fixedly journalled on the frame, the distance between the shafts 83 and 77 can be adjusted for proper operation of the chain 79 by conventional chain adjusting means indicated generally by the reference character 138. It is not believed necessary to explain the operation of the adjusting means 138 as it forms no part of the present invention and is conventional in many chain drives in use today.

It will now be seen that the machine of the present invention will receive lemons in a haphazard or random attitude and orient or arrange the lemons in a uniform attitude as they move upwardly by the roller members of the escalator or feed means. The oriented lemons are then lifted from exit end of the escalator by the fingers 69 of the transfer means which place the fruit in the uniform oriented attitude just in advance of the marking dies over which the fruit are rolled with a light pressure by the wheel members 71.

The wheel members 71, as should now be understood, are so positioned relative to the discharge point of the lemons from the transfer means to insure that the lemons will not become displaced from the desired attitude prior to the actual marking step as they are rolled over the die element. The tracks or troughs of the member 87 are, as best shown in Figure 7, of such a contour as to hold each lemon in the same attitude which it occupied between the roller members of the escalator as they move downwardly of the trough the short distance to the marking die. As the fruit contacting surface of each marking die is formed somewhat cylindrical in contour, the rolling motion of the fruit over the smoothly contoured face of the die results in a clear uniform marking and without the die scoring or cutting the skin of the fruit.

Although the now preferred embodiment of the present invention has been shown and described herein, it is to be understood that the invention is not to be limited thereto, for it is susceptible to changes in form and detail within the scope of the appended claims.

I claim:

1. A fruit arranging and marking device, comprising: a frame; a pair of endless chains, each trained about a pair of sprocket wheels mounted in aligned spaced apart relationship on said frame; a plurality of rods extending between and rotatably mounted to said chains; a plurality of rollers spacedly fixed to each rod, each of said rollers formed with a pair of spaced circumferentially extending grooves; means for driving a pair of said sprocket wheels thereby to drive said chains; means for rotating said rods in response to preselected travel of said chains whereby said rollers are rotatably driven; transfer means extending between said chains at the one end thereof and driven by said driving means, said transfer means including two pair of aligned fingers revolving in a path intersecting the path of movement of said rollers, the innermost pair of said fingers moving through the grooves of adjacent rollers as the outermost pair revolve in paths closely adjacent the end faces of said rollers to lift fruit supported between adjacent rollers as the latter move into a predetermined position on said frame; a trackway aligned with said transfer means and receiving fruit lifted from said support positions between a pair of said roller members by said transfer means; a plurality of marking dies periodically moved into openings formed in said trackway; and means for rolling fruit disposed on said trackway over a die.

2. A fruit marking device, comprising: a frame; a pair of spaced endless chains; an endless series of rollers rotatably suspended at their ends between said chains; a first shaft; a second shaft; means for journalling said shaft at opposite ends of the frame transversely thereof; spaced means on said shafts and over which said chains are trained to provide an inclined escalator; means for driving said second shaft; means carried by said frame and engaged by means carried by said rollers and operative to rotate said rollers as said chains are driven; separator means driven from said first shaft for separating fruit supplied thereto and depositing said fruit onto said rollers; the rollers being so suspended to provide longitudinally extending, substantially parallel conveyor lanes into which fruit discharged in random attitudes, said fruit being supported between adjacent rollers and moved upwardly therewith as the rollers are rotated whereby said fruit are rolled into attitudes in which the longer dimensions of the fruit are substantially parallel to the axis of said rollers; means for marking fruit longitudinally aligned with said lanes and carried adjacent the upper end of said escalator; hub members mounted in spaced apart relationship to said second shaft; a plurality of bars spanning said hub members; a plurality of fingers mounted to said bars to extend radially of said second shaft, said finger being substantially L-shaped to provide fruit supporting pockets and movable between adjacent rollers as the same reach said upper end to remove fruit supported therebetween and transfer the same without change of attitude to said marking means.

3. A fruit marking device, comprising: a frame; a pair of spaced endless chains; and endless series of rollers rotatably suspended at their ends between said chains; spaced means on said frame and over which said chains are trained to provide an inclined escalator; means carried by said frame and engaged by means carried by said rollers and operative to rotate said rollers as said chains are driven, the rollers being so suspended to provide longitudinally extending, substantially parallel conveyor lines into which fruit are discharged in random attitudes, said fruit being supported between adjacent rollers and moved upwardly therewith as the rollers are rotated whereby said fruit are rolled into attitudes in which the longer dimensions of the fruit are substantially parallel to the axis of said rollers; means for marking fruit longitudinally aligned with said lanes and carried adjacent the upper end of said escalator; transfer means located at the upper end of said escalator and including four fingers, two of which arcuately move through a pair of circumferentially extending grooves formed in each roller, the other two fingers moving closely adjacent the opposite end faces of each roller, said fingers removing fruit supported between adjacent rollers and transferring the same without change of attitude to said marking means.

References Cited in the file of this patent

UNITED STATES PATENTS

| | | |
|---|---|---|
| 626,284 | Lyons | June 6, 1899 |
| 1,553,373 | Farrand | Sept. 15, 1925 |
| 1,755,749 | Sevigne | Apr. 22, 1930 |
| 1,889,967 | Ahlburg | Dec. 6, 1932 |
| 1,926,356 | Tarlton | Sept. 12, 1933 |
| 2,160,319 | Swartz | May 30, 1939 |
| 2,424,006 | Verrinder | July 15, 1947 |

FOREIGN PATENTS

| | | |
|---|---|---|
| 603,097 | Germany | Sept. 22, 1934 |